(12) United States Patent
Samaniego Cardenas et al.

(10) Patent No.: US 9,245,397 B2
(45) Date of Patent: Jan. 26, 2016

(54) INSTRUMENT GAUGE

(71) Applicant: Continental Automotive Systems, Inc., Auburn Hills, MI (US)

(72) Inventors: Gerardo Arturo Samaniego Cardenas, Flatbush Auckland (NZ); Cesar Ascencion Buenrostro, Tlaquepaque (MX)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/269,698

(22) Filed: May 5, 2014

(65) Prior Publication Data

US 2015/0317849 A1 Nov. 5, 2015

(51) Int. Cl.
*B60Q 1/00* (2006.01)
*G07C 5/08* (2006.01)

(52) U.S. Cl.
CPC .............. *G07C 5/0825* (2013.01); *G07C 5/08* (2013.01)

(58) Field of Classification Search
CPC .......................................................... G07C 5/08

USPC .................. 340/441, 461, 462, 438, 425.5
See application file for complete search history.

(56) References Cited

U.S. PATENT DOCUMENTS

| 4,415,855 | A  | * | 11/1983 | Dubauskas | ................... | 324/114 |
| 6,404,463 | B1 | * | 6/2002 | Knoll et al. | ........................ | 349/1 |
| 7,116,216 | B2 |   | 10/2006 | Andreasen et al. | | |
| 8,497,770 | B2 | * | 7/2013 | Staffanou | ....................... | 340/441 |
| 2007/0090939 | A1 | * | 4/2007 | Takato | ........................... | 340/461 |

OTHER PUBLICATIONS

Photograph of 2008 Kawasaki Versys 3.
Photograph of Chevrolet Sonic 2012 575.
Photograph of Guzzi Gauges.

* cited by examiner

*Primary Examiner* — Brent Swarthout

(57) ABSTRACT

An instrument gauge includes a gauge face. A rotary portion is located on the gauge face. The rotary portion includes a rotary indicating element that is configured to rotate between a first rotary position and a second rotary position to indicate a first range of values of a vehicle parameter. A digital portion is located on the gauge face and includes a digital indicating element that is configured to move between a first digital position and a second digital position to indicate a second range of values of the vehicle parameter.

18 Claims, 3 Drawing Sheets

INSTRUMENT GAUGE

BACKGROUND

An instrument cluster assembly, also known as instrument panel, can include multiple gauges for displaying vehicle parameters relating to the operation of a vehicle. The vehicle parameters displayed can include at least one of speed, engine rotations per minute (RPM), engine temperature, fuel level, distance travelled or other information relating to the operation of the vehicle. A user of the vehicle must monitor the vehicle parameters to ensure safe operation of the vehicle and to identify possible vehicle maintenance or reliability issues.

Traditionally, each vehicle parameter has been communicated to a user through the use of an analog gauge with a rotating pointer. More recently, instrument clusters have incorporated digital numerical gauges for some vehicle parameters and analog gauges for other vehicle parameters. There is a need to effectively communicate a vehicle parameter to the user in order for the user to monitor operation of the vehicle.

SUMMARY

In one exemplary embodiment, an instrument gauge includes a gauge face. A rotary portion is located on the gauge face. The rotary portion includes a rotary indicating element that is configured to rotate between a first rotary position and a second rotary position to indicate a first range of values of a vehicle parameter. A digital portion is located on the gauge face and includes a digital indicating element that is configured to move between a first digital position and a second digital position to indicate a second range of values of the vehicle parameter.

In another exemplary embodiment, a method of operating an instrument gauge includes indicating a first range of a vehicle parameter by rotating a rotary indicating element on a rotary portion of the instrument gauge and indicating a second range of the vehicle parameter by illuminating a digital indicating element on a digital portion of the instrument gauge.

These and other features of the disclosed examples can be understood from the following description and the accompanying drawings, which can be briefly described as follows.

DETAILED DESCRIPTION

Figure 1:
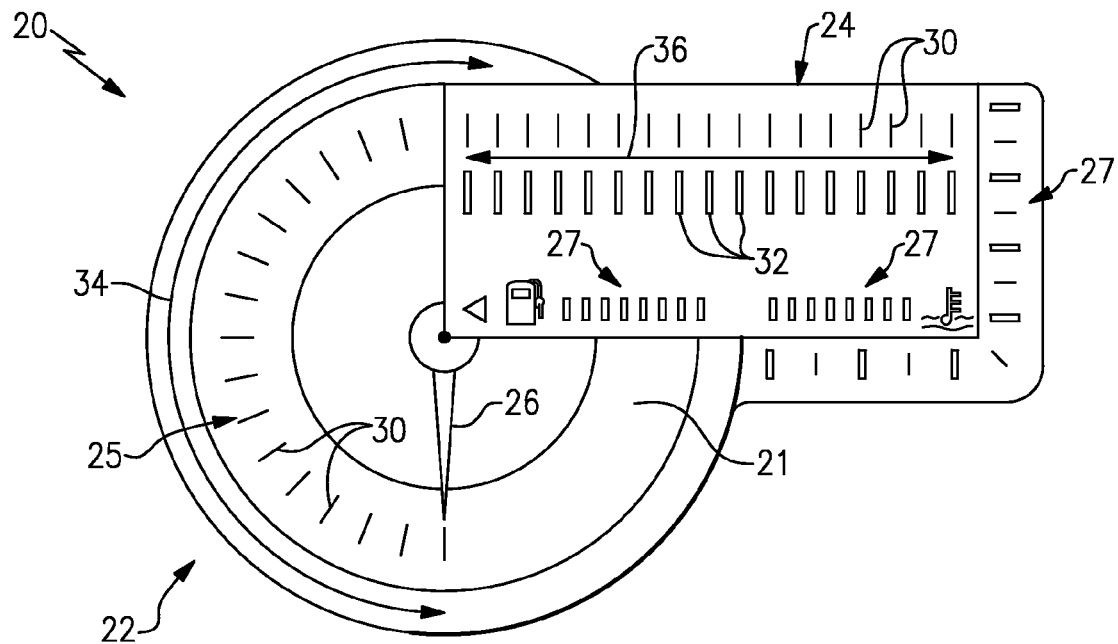
FIG. 1 illustrates an example instrument gauge.

As shown in FIG. 1, an instrument gauge 20 displays a primary vehicle parameter 25, such as speed or engine rotations per minute (RPM), and a secondary vehicle parameter 27, such as fuel level, temperature, or RPM. The instrument gauge 20 includes an instrument face 21 on a rotary portion 22 and a digital portion 24. The rotary portion 22 is a generally circular dial and the digital portion 24 is a generally rectangular protrusion extending from an upper radially outer portion of the circular dial. Parameter indicating marks 30 are located on the instrument face 21 for indicating a value of the primary vehicle parameter 25. The parameter indicating marks 30 are circumferentially spaced around the rotary portion 22 and linearly spaced along the digital portion 24 to form a set of generally equally spaced parameter indicating marks 30.

In the illustrated example, the rotary portion 22 includes a pointer 26 that pivots around a pivot axis 28. The pointer 26 could either be a traditional analog pointer or a digital pointer that simulates an analog pointer. The pointer 26 generally extends between the six o'clock position and the twelve o'clock position to indicate a first range 34 of values of the primary vehicle parameter 25. A value of the primary vehicle parameter 25 is indicted by movement of the pointer 26 around the rotary portion 22 towards the digital portion 24.

The digital portion 24 includes multiple illuminating elements 32 that correspond to at least one of the parameter indicating marks 30 to indicate a value of the primary vehicle parameter 25 in a second range 36. The first range 34 indicates a lower range of values for the primary vehicle parameter 25 and the second range 36 indicates a higher range of values for the primary vehicle parameter 25. For example, the first range 34 could include a speed between 0 MPH and 80 MPH or an RPM range between 0 RPM and 6,000 RPM and the second range 36 could include a speed between 80 MPH and 150 MPH or an RPM range between 6,000 RPM and 10,000 RPM.

Figure 2:
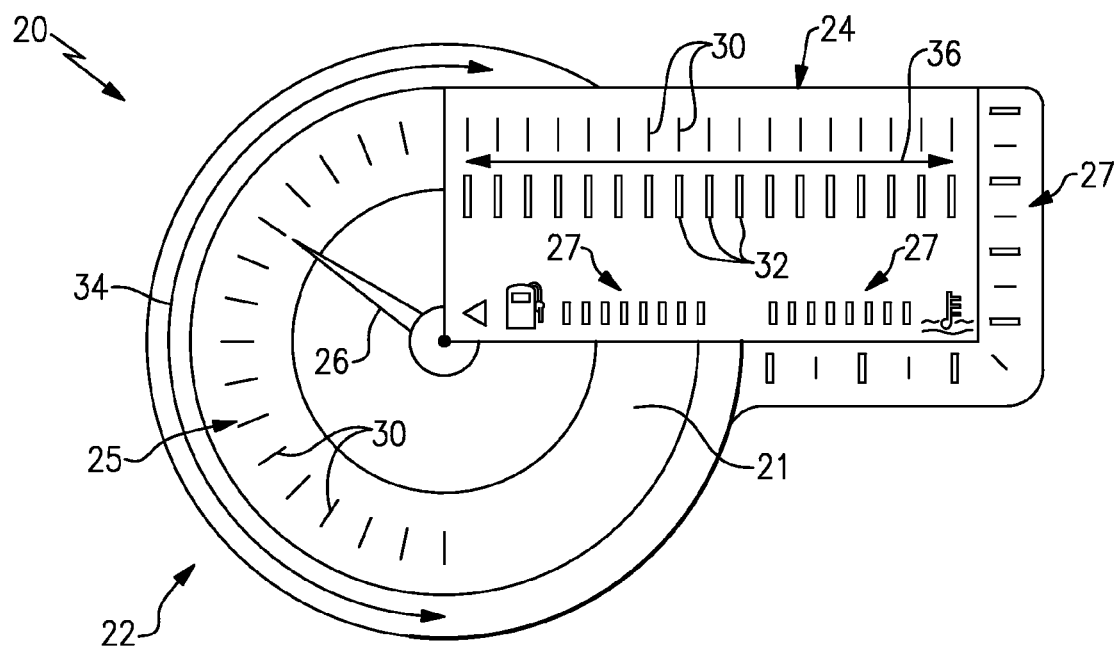
FIG. 2 illustrates the example instrument gauge of FIG. 1 indicating a first value of a vehicle parameter.

FIG. 2 illustrates the instrument gauge 20 displaying a value of the primary vehicle parameter 25 that falls within the first range 34. Only the pointer 26 on the rotary portion 22 is used to indicate the appropriate parameter indicating mark 30 that corresponds to a value of the primary vehicle parameter 25 within the first range 34.

Figure 3:
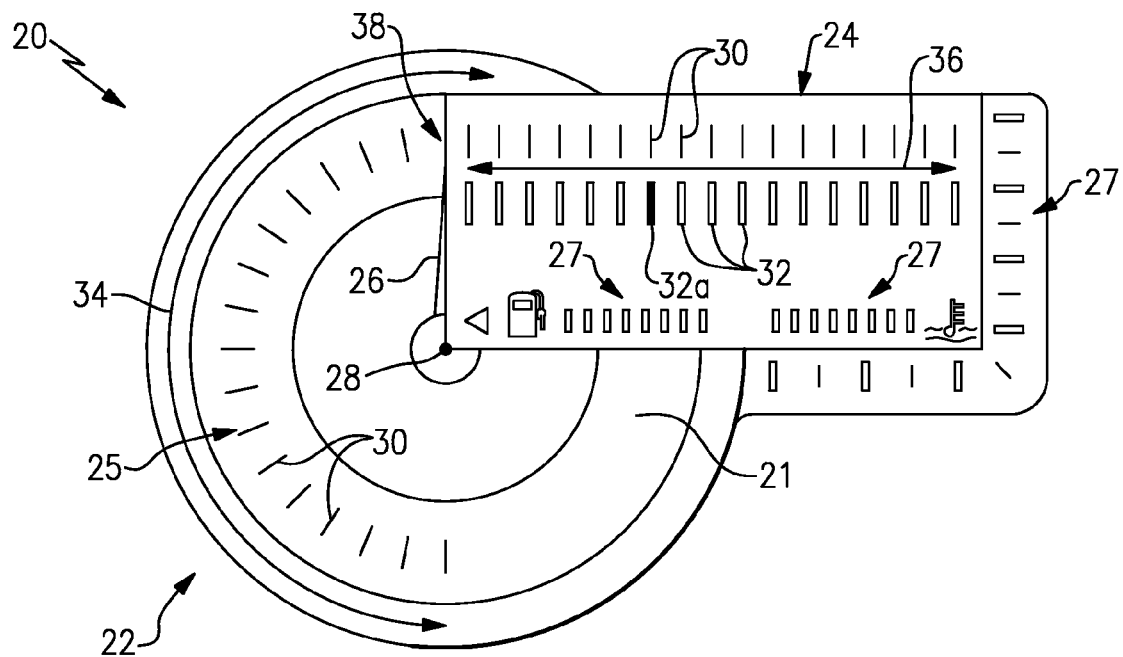
FIG. 3 illustrates the example instrument gauge of FIG. 1 indicating a second value of the vehicle parameter.

As shown in FIG. 3, when a value of the primary vehicle parameter 25 falls within the second range 36, an illuminated element 32a of the digital portion 24 indicates the appropriate parameter indicating mark 30 that corresponds to that value. The pointer 26 remains fixed at a maximum analog location 38 and is hidden behind the digital portion 24 when the value of the primary vehicle parameter 25 falls within the second range 36.

Figure 4:
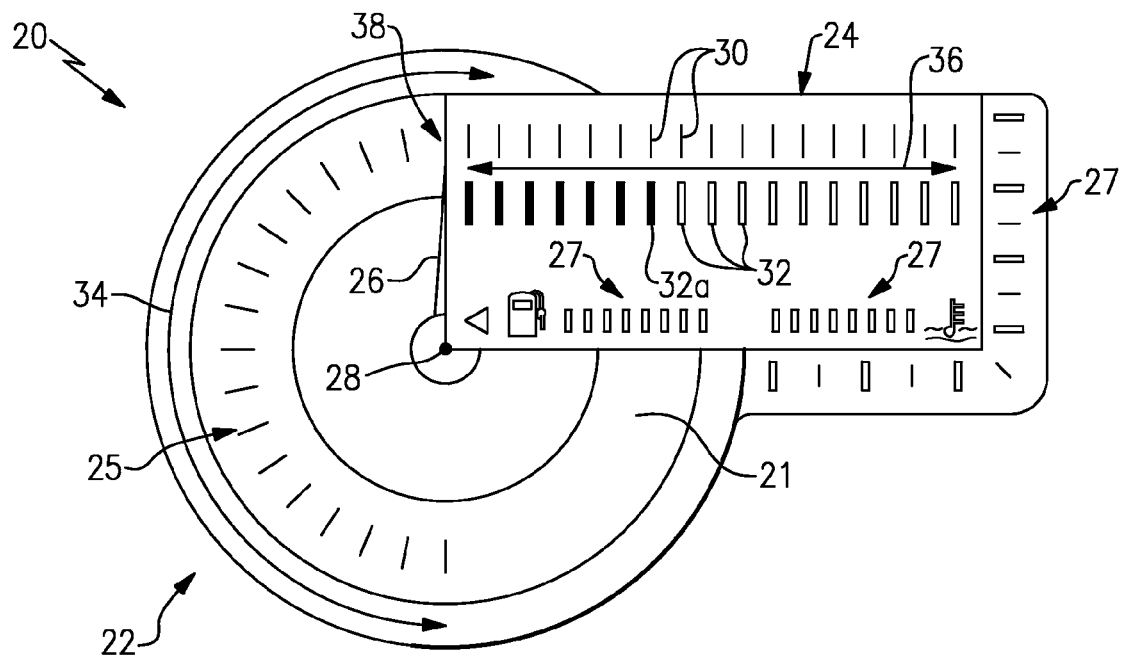
FIG. 4 illustrates another example instrument gauge.

Alternatively, as shown in FIG. 4, as the vehicle parameter increases and the illuminated element 32a moves linearly across the digital portion 24, each of the previously illuminated illuminating elements 32 remain illuminated.

Figure 5:
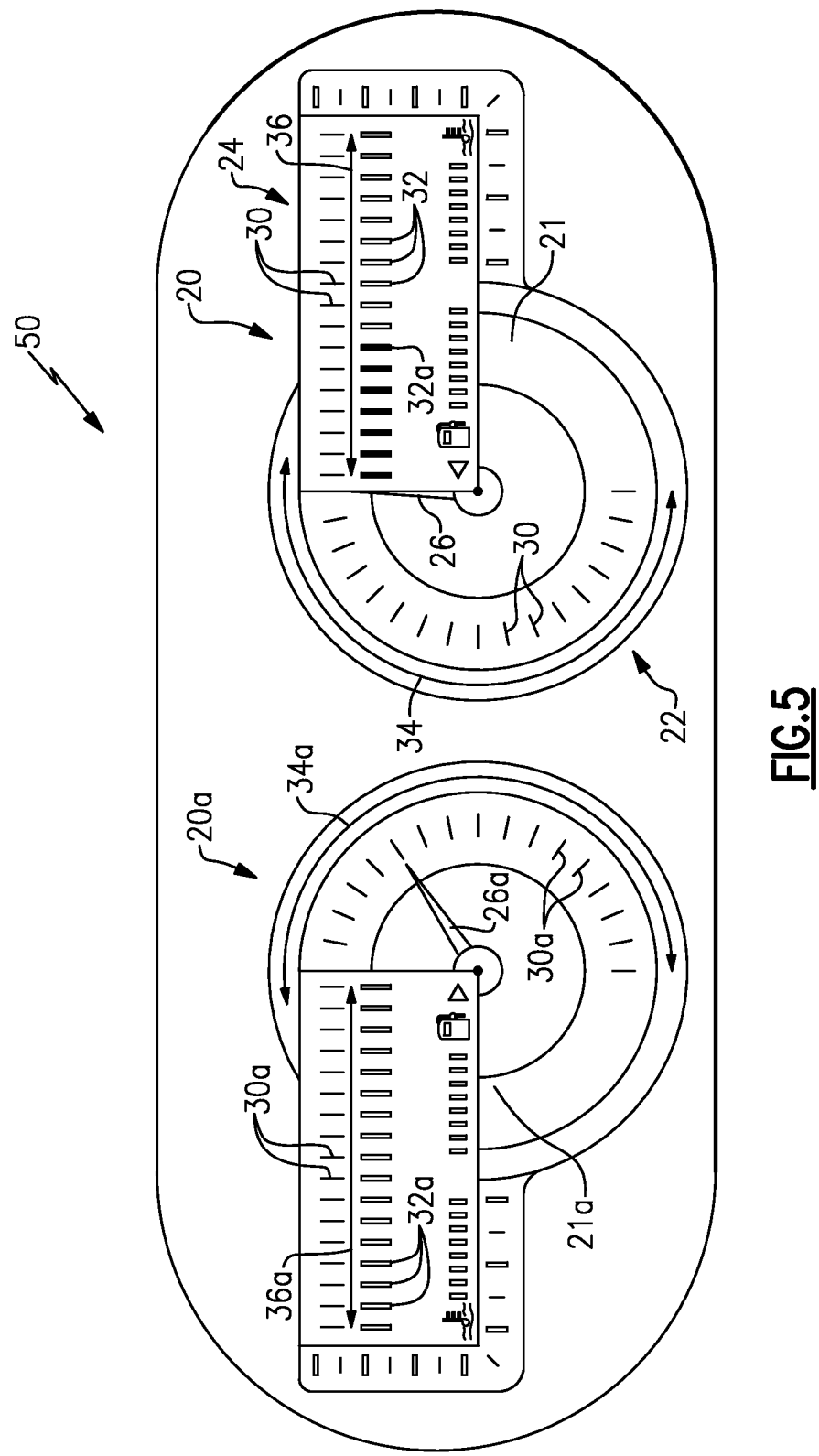
FIG. 5 illustrates an example instrument cluster.

FIG. 5 illustrates an example instrument cluster 50 including the instrument gauge 20 and a second instrument gauge 20a. The second instrument gauge 20a is substantially similar to the instrument gauge 20 except that the instrument gauge 20a is a mirror image of the instrument gauge 20. The instrument gauge 20 will indicate a different primary vehicle parameter 25 and different secondary vehicle parameters 27 than the second instrument gauge 20a.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An instrument gauge comprising:
   a gauge face;
   a rotary portion located on the gauge face, the rotary portion including a rotary indicating element configured to rotate between a first rotary position and a second rotary position to indicate a first range of values of a vehicle parameter;

a digital portion located on the gauge face including a digital indicating element configured to move between a first digital position and a second digital position to indicate a second range of values of the vehicle parameter, wherein either the first rotary position or the second rotary position substantially coincides with either the first digital position or the second digital position to provide a continuous range scale for the vehicle parameter.

2. The instrument gauge of claim 1 wherein the rotary portion is a generally circular dial.

3. The instrument gauge of claim 2 wherein the digital portion is a generally rectangular protrusion extending from the generally circular dial.

4. The instrument gauge of claim 1 wherein the rotary indicating element is an analog pointer.

5. The instrument gauge as recited in claim 4 wherein the analog pointer is configured to pivot around an axis.

6. The instrument gauge as recited in claim 1 wherein the instrument gauge is a tachometer and the vehicle parameter is revolutions per minute.

7. The instrument gauge as recited in claim 1 wherein the instrument gauge is a speedometer and the vehicle parameter is speed.

8. The instrument gauge as recited in claim 1 wherein the digital indicating element extends linearly.

9. The instrument gauge as recited in claim 1 wherein the first digital position of the digital indicating element is adjacent the second rotary position of the rotary indicating element.

10. A method of operating an instrument gauge comprising:
    indicating a first range of a vehicle parameter by rotating a rotary indicating element on a rotary portion of the instrument gauge between a first rotary position and a second rotary position to indicate a first range of values of a vehicle parameter; and
    indicating a second range of the vehicle parameter by illuminating a digital indicating element on a digital portion of the instrument gauge between a first digital position and a second digital position to indicate a second range of values of the vehicle parameter, wherein either the first rotary position or the second rotary position substantially coincides with either the first digital position or the second digital position to provide a continuous range scale for the vehicle parameter.

11. The method as recited in claim 10 wherein the first digital position is adjacent the second rotary position.

12. The method as recited in claim 10 wherein the rotary indicating element is an analog pointer and is configured to rotate around an axis.

13. The method as recited in claim 10 wherein the digital output extends linearly.

14. The instrument gauge of claim 1, wherein the first range of values of the vehicle parameter is different from the second range of values of the vehicle parameter.

15. The instrument gauge of claim 14, wherein the first range of values of the vehicle parameter is less than the second range of values of the vehicle parameter and the rotary portion is rigidly fixed to the digital portion.

16. The instrument gauge of claim 1, wherein the first range of the vehicle parameter begins at the first rotary position and ends at the second rotation portion and the second range of the vehicle parameter begins at the first digital position and ends at the second digital position and the second rotary position ends at the first digital position.

17. The method of claim 10, wherein the first range of the vehicle parameter begins at a first rotary position and ends at a second rotary portion and the second range of the vehicle parameter begins at a first digital position and ends at a second digital position and the second rotary position ends at the first digital position.

18. The method of claim 10, wherein the instrument gauge includes a gauge face and the rotary portion and the digital portion are located on the gauge face.

* * * * *